(12) United States Patent
Cavallaro et al.

(10) Patent No.: US 10,795,415 B2
(45) Date of Patent: Oct. 6, 2020

(54) FOLDABLE DISPLAY WITH STIFF SUPPORT

(71) Applicant: Motorola Mobility LLC, Chicago, IL (US)

(72) Inventors: Alberto R. Cavallaro, Northbrook, IL (US); Roger W. Harmon, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/262,266

(22) Filed: Jan. 30, 2019

(65) Prior Publication Data

US 2020/0241594 A1 Jul. 30, 2020

(51) Int. Cl.
  *G06F 1/16* (2006.01)
  *H04M 1/02* (2006.01)
  *B32B 7/12* (2006.01)
  *B32B 37/12* (2006.01)

(52) U.S. Cl.
  CPC .............. *G06F 1/1652* (2013.01); *B32B 7/12* (2013.01); *B32B 37/12* (2013.01); *G06F 1/1616* (2013.01); *H04M 1/0214* (2013.01); *H04M 1/0268* (2013.01); *B32B 2457/20* (2013.01)

(58) Field of Classification Search
  CPC .. G06F 1/1616; G06F 1/1652; H04M 1/0214; H04M 1/0268; B32B 7/12
  See application file for complete search history.

(56) References Cited

U.S. PATENT DOCUMENTS

| | | | | |
|---|---|---|---|---|
| 9,173,287 B1* | 10/2015 | Kim | ....................... | H05K 1/028 |
| 9,913,392 B2 | 3/2018 | Cavallaro et al. | | |
| 9,947,726 B2* | 4/2018 | Lee | ......................... | H01L 27/323 |
| 10,424,749 B2* | 9/2019 | Kim | .................... | H01L 51/0097 |
| 2015/0055308 A1* | 2/2015 | Lim | ....................... | G06F 1/1652 |
| | | | | 361/749 |
| 2016/0081180 A1* | 3/2016 | Huitema | .............. | H05K 1/0274 |
| | | | | 361/749 |
| 2018/0052491 A1* | 2/2018 | Kapinos | ................ | G06F 1/1616 |
| 2018/0192527 A1* | 7/2018 | Yun | ....................... | H05K 5/0017 |
| 2018/0356859 A1* | 12/2018 | Hamburgen | ......... | G06F 1/1626 |
| 2019/0340959 A1* | 11/2019 | Park | ..................... | H01L 27/3246 |

* cited by examiner

*Primary Examiner* — Nidhi Thaker
(74) *Attorney, Agent, or Firm* — SBMC

(57) ABSTRACT

A foldable display has multiple layers, including at least a display layer that creates the display that users see when looking at the foldable display and a stiff support layer that provides the display layer with support despite the foldable nature of the display. An adhesive layer binds the display layer to the stiff support layer. The stiff support layer has a stiffness that is at least six times greater than the stiffness of the adhesive layer and at least six times greater than the stiffness of the display layer. Given the foldable nature of the display, there is typically a hinge system below part of the display. In situations in which pressure is applied to the foldable display (e.g., by a user's finger or stylus), the stiffness of the stiff support layer prevents the display from being damaged despite the presence of the hinge system.

20 Claims, 9 Drawing Sheets

FOLDABLE DISPLAY WITH STIFF SUPPORT

BACKGROUND

As technology has advanced, computing devices have become increasingly mobile. For example, wireless phones, tablets, and smartwatches have become increasingly commonplace. In order to increase the screen size of some devices while in use, some devices are implementing a foldable display. Although these foldable displays do have a bigger display size, they are not without their problems. One such problem is that a hinge system in the device typically allows the device, including the display, to be folded, but can provide insufficient support to the display itself. This can result in discontinuities in and poor operation of the foldable display, leading to user frustration and dissatisfaction with their devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a display stack-up includes a display layer and a stiff support layer. The display layer forms images for viewing, and is flexible and able to bend. The stiff support layer provides support to the display layer, and is also flexible and able to bend. The display layer and the stiff support layer each have first and second base surfaces and a thickness between the first and second base surfaces that defines a height of a lateral surface at a periphery of the layer, the display layer and the stiff support layer being stacked along an axis perpendicular to their first and second base surfaces and parallel to their lateral surfaces. The display stack-up also includes an adhesive layer including an adhesive arranged to bind the display layer to the stiff support layer. The stiff support layer has a stiffness that is at least six times greater than the stiffness of the adhesive layer and at least six times greater than the stiffness of the display layer.

BRIEF DESCRIPTION OF THE DRAWINGS

Embodiments of a foldable display with stiff support are described with reference to the following drawings. The same numbers are used throughout the drawings to reference like features and components.

DETAILED DESCRIPTION

A foldable display with stiff support is discussed herein. A foldable display includes multiple layers. The topmost or outermost layer is an outer cover lens made from, for example, a plastic or hard coat laminate. An optically clear adhesive binds the cover lens to a display layer. The display layer is a laminate with thin film electronics and coatings, and creates the display that users see when looking at the foldable display. An adhesive binds the display layer to a support layer. The support layer is a stiff support layer, providing the higher layers (e.g., the display layer and the cover lens) with support despite the foldable nature of the display. The support layer material can be, for example, metal, glass, ceramic, or composite.

Given the foldable nature of the display, there is typically an area below part of the display where a hinge system is present. In situations in which pressure is applied to the cover lens (e.g., by a user touching the display with his or her finger or with a stylus), particularly above the area where the hinge system is present, the stiffness of the support layer prevents the display from being damaged despite the presence of the hinge system.

Figure 1:
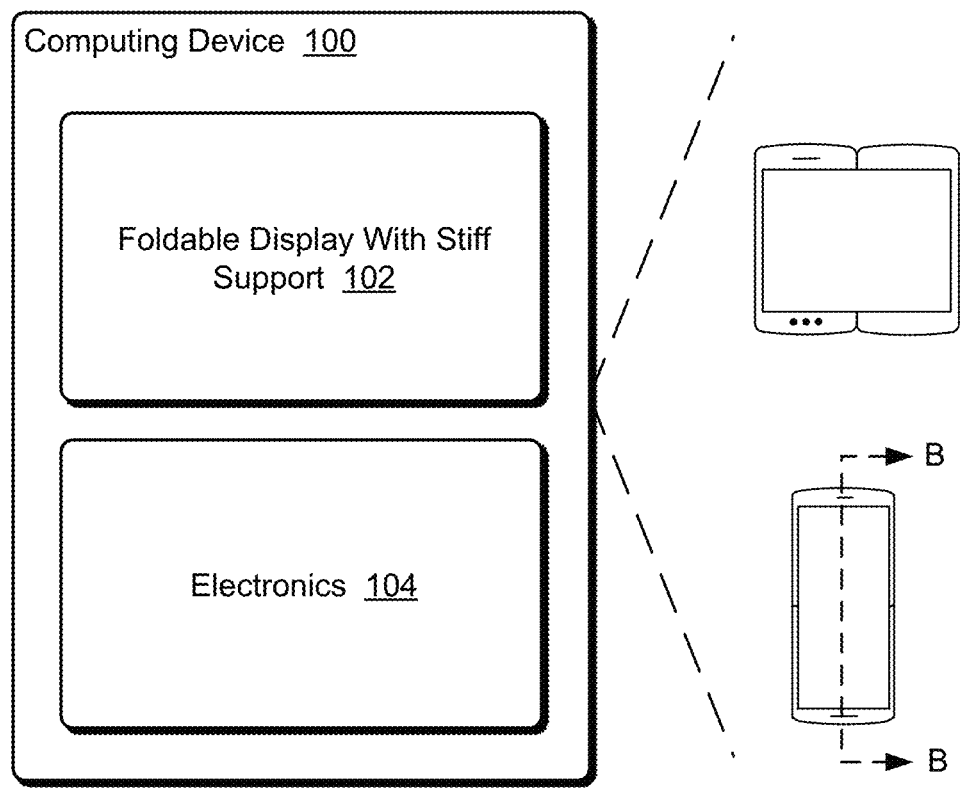
FIG. 1 illustrates an example computing device implementing the techniques discussed herein.

FIG. 1 illustrates an example computing device 100 implementing the techniques discussed herein. The computing device 100 can be, or include, many different types of computing or electronic devices. For example, the computing device 100 can be a smartphone or other wireless phone (e.g., a flip-phone or clamshell form factor), a notebook computer (e.g., netbook or ultrabook), a laptop computer, a wearable device (e.g., a smartwatch, an augmented reality headset or device, a virtual reality headset or device), a tablet or phablet computer, a personal media player, an Internet of Things (IoT) device, and so forth.

The computing device 100 includes a foldable display with stiff support 102 and electronics 104. The foldable display with stiff support 102 is a flexible material that can be bent or otherwise deformed, and return to its original shape. The foldable display with stiff support 102 can be configured as any suitable type of display, such as a light-emitting diode (LED) display, an organic light-emitting diode (OLED) display, a liquid crystal display (LCD), and so forth.

The computing device 100 also includes electronics 104. Electronics 104 represent hardware components for operating the computing device 100. In one or more embodiments, electronics 104 can represent one or more integrated circuit chips and circuitry. For example, electronics 104 can include a processor, a microphone, a speaker, a modem, motion detecting sensors, and so forth.

In one or more embodiments, the computing device 100 is a foldable device that is designed to fold over so that the device is longer or wider while open, and shorter or narrower when closed. For example, the computing device 100 can have a clamshell form factor.

It should be noted that the computing device 100 can be flexible to support one or both of concave bending and convex bending of the foldable display with stiff support 102. Accordingly, although concave bending is shown in some of the figures, the techniques discussed herein can analogously apply to convex bending of the foldable display with stiff support 102.

Figure 2:
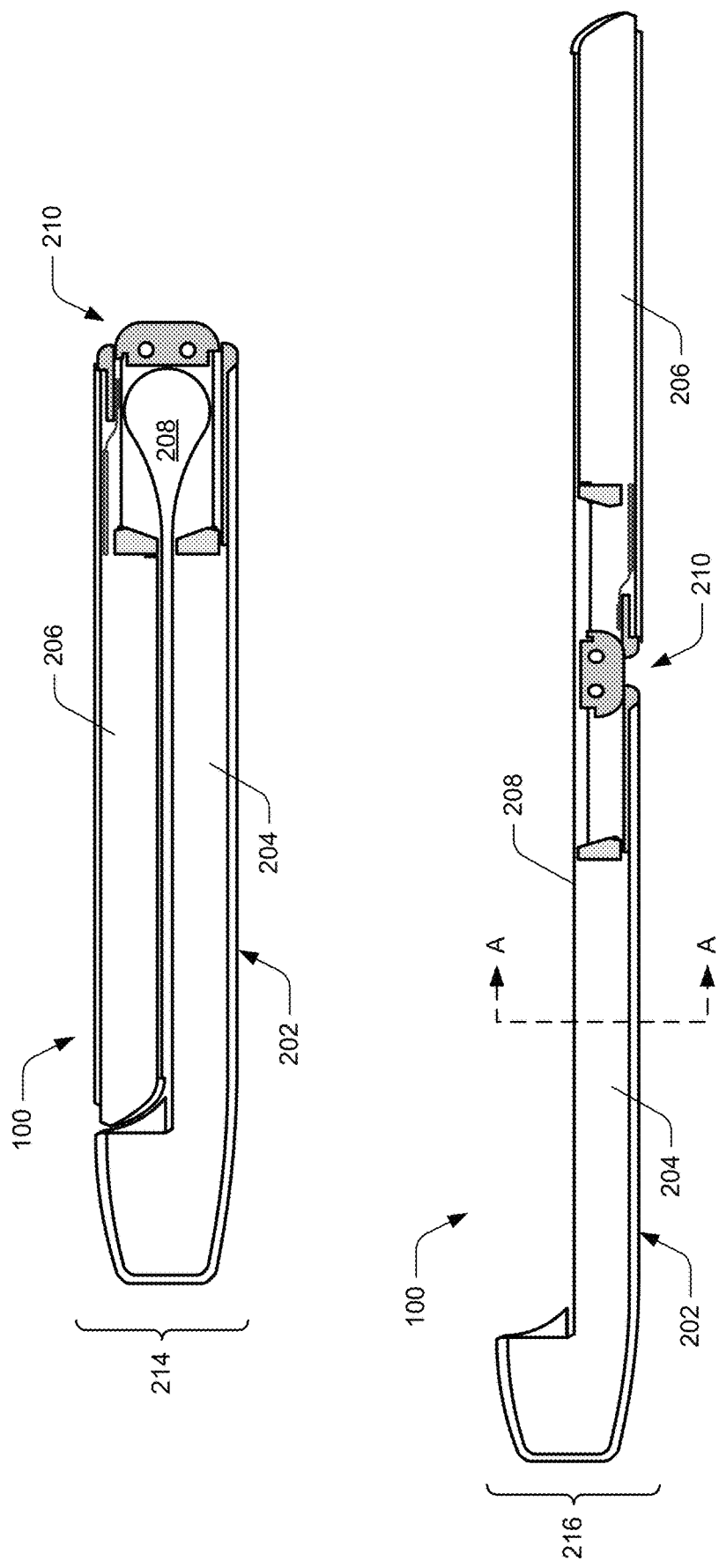
FIG. 2 illustrates an example side view of a computing device.

FIG. 2 illustrates an example side view of a computing device 100. In the example of FIG. 2, the computing device 100 is a flip-phone having a clamshell form factor. The computing device 100 includes a device housing 202 with a base section 204 of the device housing and a flip section 206 of the device housing. The computing device 200 includes a foldable display 208 implemented throughout both the base section 204 and the flip section 206 of the device housing 202. In the example of FIG. 2, the foldable display 208 is the foldable display with stiff support 102 of FIG. 1.

The computing device 200 is implemented with a hinge system 210 that includes components operable to open and close the flip section 206 of the device housing 202 relative to the base section 204 of the device housing 202. Additionally, the hinge system 210 is operable to fold the foldable display 208 as the flip section 206 of the device housing 202 folds onto the base section 204 of the device housing in a closed position 214 of the mobile device 200. In this example, the foldable display 208 is shown looped in a folded position proximate the hinge system 210 in the closed position 214 of the computing device 100.

The hinge system 210 opens to the open position 216 of the computing device 102, where the hinge is open to approximately one-hundred eighty degrees (180 deg). As illustrated, when the computing device 102 is in the open position 216 the foldable display is unfolded and extends across both the base section 204 of the device housing and the flip section 206 of the device housing.

Figure 3:
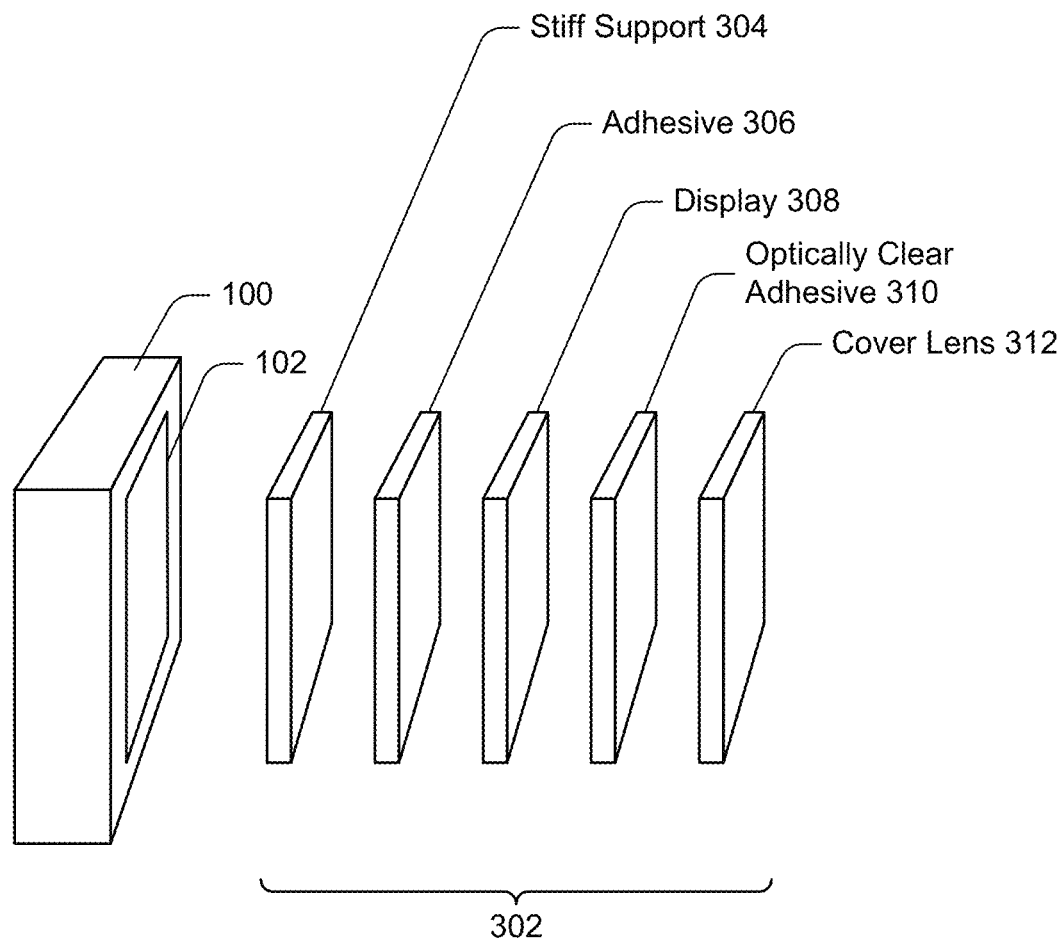
FIG. 3 shows an exploded diagram of a computing device illustrating example layers of a display stack-up.

FIG. 3 shows an exploded diagram of the computing device 100 illustrating example layers of a display stack-up 302. The computing device 100 with the foldable display with stiff support 102 is shown. The display stack-up 302 is arranged at the front of the computing device 100 and includes multiple layers. Each layer has first and second base surfaces and a thickness therebetween that defines a height of a lateral surface at a periphery of the layer at a periphery around a perimeter of the layer. The multiple layers are stacked along an axis perpendicular to their base surfaces and parallel to their lateral surfaces.

As illustrated in FIG. 3, the multiple layers in the display stack-up 302 include a stiff support layer 304, an adhesive layer 306, a display layer 308, an optically clear adhesive layer 310, and a cover lens layer 312 stacked as illustrated along an axis that is perpendicular to the face of the computing device 100. Starting at the face of the computing device 100 is the stiff support layer 304, followed by the adhesive layer 306, followed by the display layer 308, followed by the optically clear adhesive layer 310, and followed by the cover lens layer 312 at the very top of the display stack-up 302.

Figure 4:
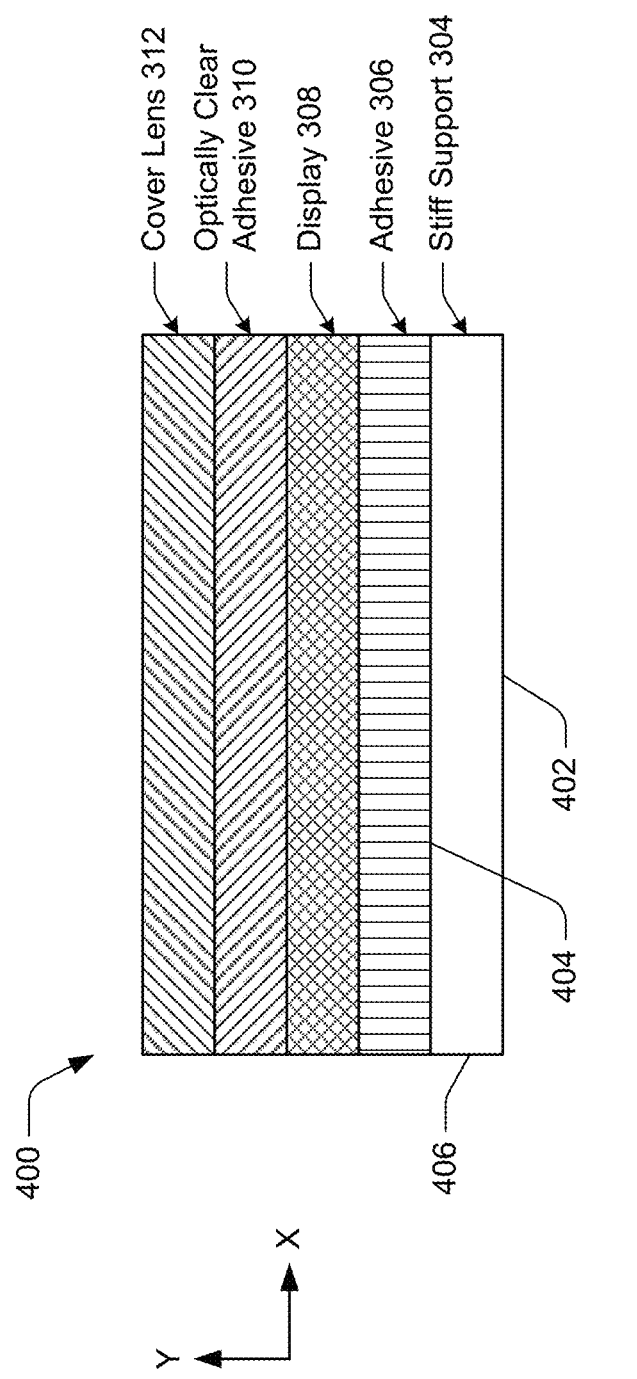
FIG. 4 shows an example cross-sectional view of a display stack-up.

FIG. 4 shows an example cross-sectional view of a display stack-up 400. The cross-sectional view in FIG. 4 is a cross-sectional view of the display stack-up of the foldable display 208 along the dashed line A illustrated in FIG. 2. The display stack-up 400 can be, for example, the display stack-up 302 of FIG. 3. The display stack-up 400 makes up a foldable display, and accordingly each layer 304-312 of the display stack-up 400 is foldable (is made of a flexible material that can be bent or otherwise deformed, and return to its original shape).

As discussed above, each layer in the display stack-up 400 includes first and second base surfaces. As an example, for the display stack-up 400, the stiff support layer 304 has a first base surface 402 and a second base surface 404 having a thickness therebetween that defines a height of a lateral surface 406 at a periphery of the stiff support layer 304. The layers 304-312 are stacked along an axis (y-axis) perpendicular to their base surfaces and parallel to their lateral surfaces. For example, the y-axis is perpendicular to a face of a computing device that includes the display stack-up 400.

The stiff support layer 304 is a stiff support, providing support to the higher layers in the foldable display (layers 306-312). The stiff support layer 304 can be made of various materials, such as metal (e.g., aluminum or stainless steel), glass, ceramic, graphene, or other composite. In one or more embodiments, the stiff support layer 304 has a stiffness of at least 60 gigapascals (GPa) and a thickness in the range of 20 to 60 micrometers (um). The stiff support layer 304 also has a tensile strength in the range of 1500 to 3000 megapascals (MPa). With these characteristics, the stiff support layer 304 has a modulus of elasticity in the range of 60 to 1200 GPa. The combination of material properties for the stiff support layer 304 allow for curvature of the display stack-up 400 with bend radii between 2 to 6 millimeters (mm) for the range of thickness and range of anticipated cycles (e.g., opening and closing the flip-phone) in the range of 200 to 200,000.

The adhesive layer 306 is an adhesive arranged to bind the stiff support layer 304 to the display layer 308. The adhesive layer 306 can be made of any of a variety of different low modulus materials (e.g., in the range of 1 to 500 kilopascals (KPa)), such as an acrylate or silicone. The adhesive layer 306 need not be, but can be, an optically clear adhesive layer. In one or more embodiments, the adhesive layer 306 has a stiffness in the range of 1 to 100 KPa and a thickness in the range of 10 to 100 um.

The display layer 308 can be any single-layered or multi-layered display structure or assembly used to form images for viewing on the computing device 100. The display layer 308 can be, for example, a laminate with thin film electronics and coatings. In one or more embodiments, the display layer 308 has a stiffness in the range of 1 to 10 GPa and a thickness in the range of 10 to 100 um. The display layer 308 is optionally a touch-sensitive layer capable of detecting an object (e.g., a user's finger or stylus) touching the display stack-up 400 (e.g., touching the cover lens layer 312).

The optically clear adhesive layer 310 is an optically clear adhesive arranged to bind the display layer 308 to the cover lens layer 312. The optically clear adhesive layer 310 being optically clear refers to the optically clear adhesive layer 310 not interfering with a user's viewing of images formed on the display layer 308 (e.g., the optically clear adhesive layer 310 is not visible to the user or the user can easily see through the optically clear adhesive layer 310). The optically clear adhesive layer 310 can be made of any of a variety of different low modulus materials (e.g., in the range of 1 to 500 KPa), such as an acrylate or silicone. In one or more embodiments, the optically clear adhesive layer 310 has a stiffness in the range of 1 to 100 KPa and a thickness in the range of 10 to 100 um.

The cover lens layer 312 is an outer cover lens for the display stack-up 400, providing protection to the lower layers in the foldable display (layers 304-310), such as protection from cuts and scratches. The cover lens layer 312 can be made of various materials, such as a plastic/hard coat laminate. In one or more embodiments, the cover lens layer 312 has a stiffness in the range of 1 to 10 GPa and a thickness in the range of 10 to 100 um.

The layers 304-312 have various different ranges of thicknesses as discussed above. The thickness of a layer refers to the depth or height of the layer along the axis perpendicular to the first and second base surfaces of the layer. As an example, in one or more embodiments, the support layer 304 is 10 um thick, the adhesive layer 306 is 50 um thick, the display layer 308 is 68 um, the optically clear adhesive layer 310 is 25 um thick, and the cover lens layer 312 is 60 um thick.

The stiff support layer 304 has a significantly higher stiffness than each of the other layers in the display stack-up 400. For example, the stiff support layer can have a stiffness that is at least six times greater than the stiffness of each of the other layers in the display stack-up 400. This stiffness of the stiff support layer 304 provides rigid support the other layers in the display stack-up 400 to prevent the stresses from localized loads along discontinuities from damaging the display layer 308 as well as other layers in the display stack-up 400. These discontinuities can take various different forms, such as a crease between two materials, a gap between two materials, a protrusion from a hinge system, and so forth.

Each of the layers 304-312 of the display stack-up 400 has first and second base surfaces as discussed above. The surface area of each of these first and second base surfaces, as well as the geometric shapes and dimensions of these first and second base surfaces, of each of these layers 304-312 is approximately the same size (e.g., within a threshold amount, such as 95% of one another). For example, the first and second base surfaces can each be a rectangle having approximately the same width and length.

It should be noted that although multiple layers 304-312 are illustrated in FIG. 4 and discussed herein as being part of the display stack-up of the foldable display with stiff support 102, in some situations not all of these layers need be included in the display stack-up. For example, in situations in which the display layer 308 is generated using materials that do not need protection from scratching or cutting, the cover lens layer 312 (and thus the optically clear adhesive layer 310) need not be included in the display stack-up.

Further, it should be noted that additional layers can optionally be added to the display stack-up of the foldable display with stiff support 102. Any such additional layers are flexible, and have a thickness and stiffness that are not greater than the thickness and stiffness ranges of the layers 306-312 discussed above. Furthermore, the stiff support layer 304 has a stiffness that is at least six times greater than the stiffness of any of such additional layers. For example, one or more conductive layers used to detect an object (e.g., a user's finger or stylus) touching the display stack-up can be included in the display stack-up. Such a layer can be constructed from, for example, indium tin oxide (ITO) thin films. Additionally or alternatively, the functionality to detect an object touching the display stack-up can be included in the display layer 308.

Figure 5:
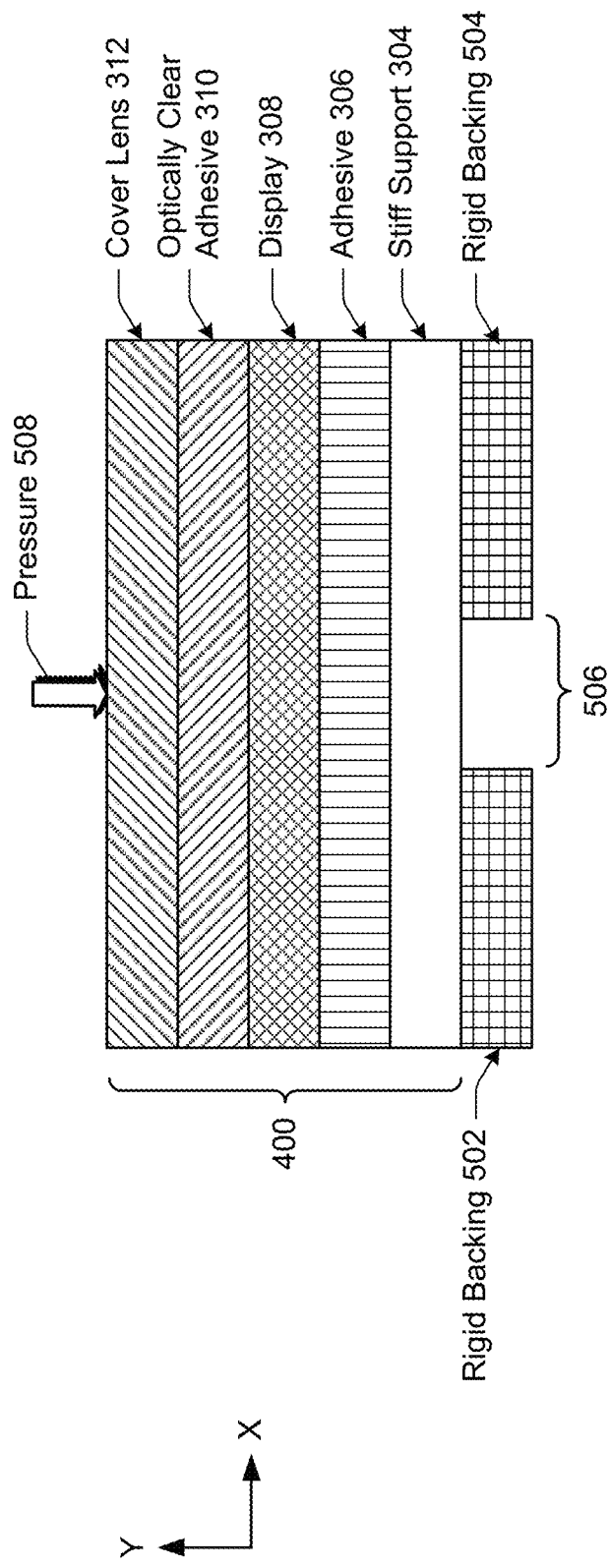
FIG. 5 shows an example cross-sectional view of a display stack-up with an additional backing.

FIG. 5 shows an example cross-sectional view of a display stack-up with an additional backing. FIG. 5 illustrates the protection that the stiff support layer 304 provides to the layers of the display stack-up 400. The cross-sectional view in FIG. 4 is a cross-sectional view of the display stack-up of the foldable display along the dashed line B illustrated in FIG. 1. The display stack-up 400 is the same display stack-up 400 as illustrated in FIG. 4.

The display stack-up 400 includes a stiff support layer 304, an adhesive layer 306, a display layer 308, an optically clear adhesive layer 310, and a cover lens layer 312 as discussed above. The display stack-up 400 is backed by rigid backings 502 and 504. In one or more embodiments, one of the rigid backings 502 and 504 is located in the base section 204 of the device housing and the other of the rigid backings 502 and 504 is located in the flip section 206 of the device housing.

The rigid backings 502 and 504 can be made of any of a variety of materials, such as metal or a composite, and is designed to be rigid rather than flexible. Accordingly, when the display stack-up 400 is folded, the rigid backings 502 and 504 each remain rigid and do not fold. The rigid backings 502 and 504 are optionally bound to the stiff support layer 304, such as by an additional adhesive layer (not shown).

The computing device 100 incorporating the display stack-up 400 typically has a hinge system that allows the computing device 100 to be folded. The rigid backings 502 and 504 back part of the display stack-up 400, but there are discontinuities in the hinge system that prevent the rigid backings 502 and 504 from backing the entire display stack-up 400. These discontinuities are illustrated as a gap 506 between rigid backing 502 and rigid backing 504. This gap 506 can contain no material, just empty space.

Without the stiff support layer 304, pressure applied to the display stack-up 400 in an area above (e.g., along the y-axis) the discontinuities in the hinge system that prevent the rigid backings 502 and 504 from backing the entire display stack-up 400 can deform and damage the display layer 308 as well as other layers of the display stack-up 400. An example of such pressure is illustrated as pressure 508, which can be applied by an object (e.g., finger or stylus) touching the cover lens layer 312.

However, the stiff support layer 304 spans the discontinuities in the hinge system that prevent the rigid backings 502 and 504 from backing the entire display stack-up 400. Accordingly, the stiff support layer 304 provides support to the additional layers of the display stack-up 400 (e.g., layers 306-312) despite the discontinuities in the hinge system that prevent the rigid backings 502 and 504 from backing the entire display stack-up 400. The stiffness of the stiff support layer 304, as discussed above, prevents the display layer 308 as well as other layers of the display stack-up 400 from being damaged despite the presence of the hinge system and any discontinuities in the hinge system that prevent the rigid backings 502 and 504 from backing the entire display stack-up 400.

Although a single gap 506 of discontinuities in the rigid backings 502 and 504 is illustrated in FIG. 5, it should be noted that in some situations there can be additional areas of discontinuities in the rigid backings 502 and 504, such as areas between mating housing surfaces or other features (e.g., holes or cutouts) in the device housing that are needed for assembly of the computing device). In such situations, the stiff support layer 304 provides protection to the layers of the display stack-up 400 in the presence of such additional discontinuities in the rigid backings 502 and 504.

Figure 6:
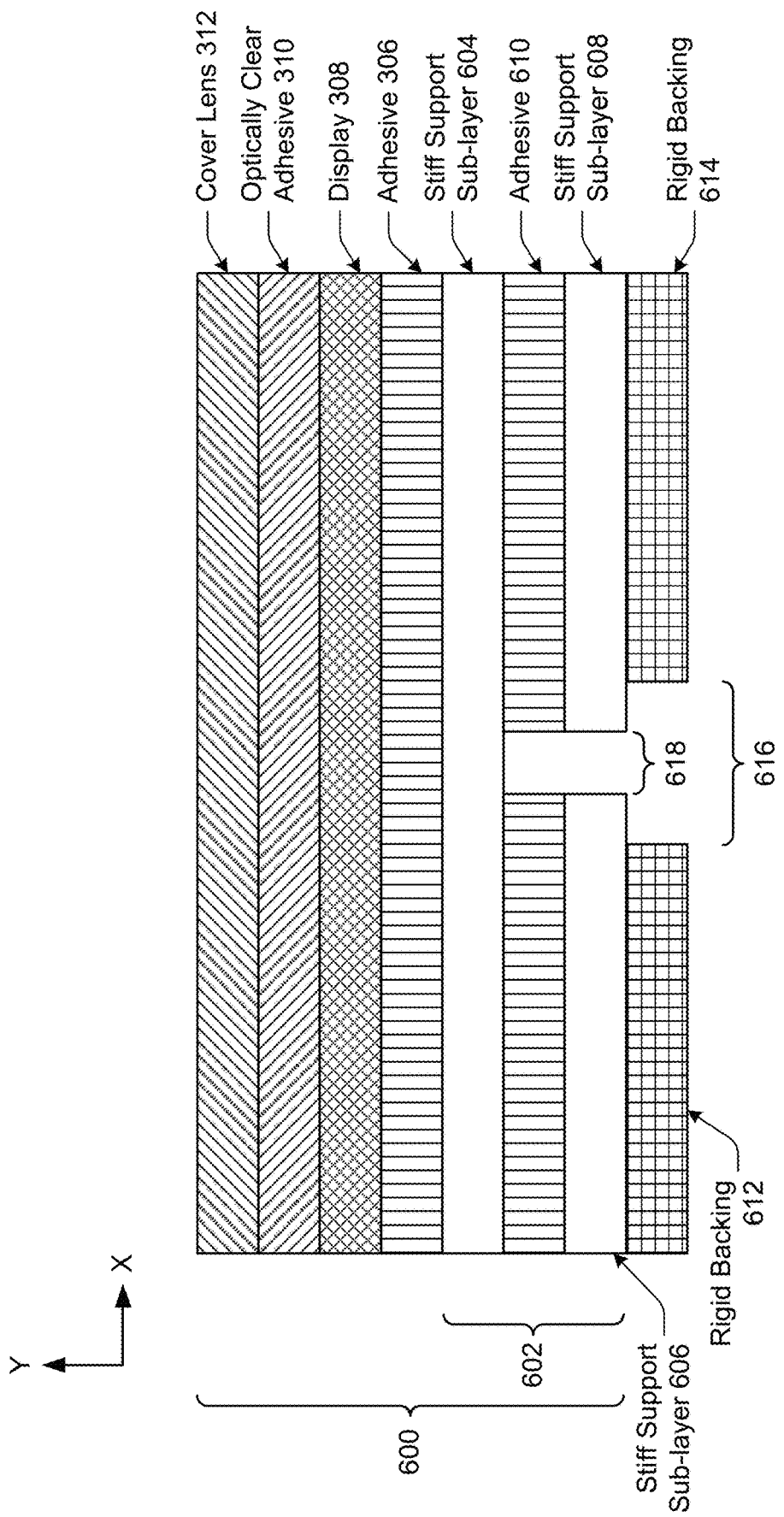
FIG. 6 shows another example cross-sectional view of a display stack-up with an additional backing.

FIG. 6 shows another example cross-sectional view of a display stack-up 600 with an additional backing. The cross-sectional view in FIG. 6 is a cross-sectional view of the display stack-up of the foldable display 208 along the dashed line B illustrated in FIG. 2. The display stack-up 600 makes up a foldable display, and accordingly each layer of the display stack-up 600 is foldable (is made of a flexible material that can be bent or otherwise deformed, and return to its original shape). The display stack-up 600 is similar to the display stack-up 400 of FIG. 4, but differs in that the stiff support layer 304 of the display stack-up 400 is separated into multiple different sub-layers that support different (but overlapping) portions of the other layers 306-312. These different sub-layers result in a stiff support layer 602 having variable thickness.

The display stack-up 600 includes an adhesive layer 306, a display layer 308, an optically clear adhesive layer 310, and a cover lens layer 312 as discussed above. The display stack-up 400 also includes a stiff support layer 602 that includes stiff support sub-layers 604, 606, and 608. In the display stack-up 302 of FIG. 3 discussed above, the stiff support layer 602 can be used as the stiff support layer 304.

The adhesive layer 306 is an adhesive arranged to bind the stiff support sub-layer 604 to the display layer 308. An adhesive layer 610 is an adhesive arranged to bind the stiff support sub-layer 604 to the stiff support sub-layer 606 and the stiff support sub-layer 608. The adhesive layer 610 can be made of any of a variety of different low modulus materials (e.g., in the range of 1 to 500 KPa), such as an acrylate or silicone, and can be the same material as used for the adhesive layer 306. The adhesive layer 610 need not be, but can be, an optically clear adhesive layer. In one or more embodiments, the adhesive layer 610 has a stiffness in the range of 1 to 100 KPa and a thickness in the range of 10 to 100 um.

The stiff support sub-layer 604 is a stiff support, providing support to the higher layers in the foldable display (layers 306-308). The stiff support sub-layer 604 can be made of various materials, such as metal (e.g., aluminum or stainless steel), glass, ceramic, graphene, or other composite. In one or more embodiments, the stiff support sub-layer 604 has a stiffness of at least 60 GPa and a thickness in the range of 20 to 60 um. The stiff support layer 304 also has a tensile strength in the range of 1500 to 3000 MPa. With these characteristics, the stiff support layer 304 has a modulus of elasticity in the range of 60 to 1200 GPa. The combination of material properties for the stiff support sub-layer 604 allow for curvature of the display stack-up 600 with bend radii between 2 to 6 mm for the range of thickness and range of anticipated cycles (e.g., opening and closing the flip-phone) in the range of 200 to 200,000.

The display stack-up 600 is backed by rigid backings 612 and 614. The rigid backings 612 and 614 can be made of any of a variety of materials, such as metal or a composite, and are designed to be rigid rather than flexible. The rigid backings 612 and 614 are analogous to the rigid backings 502 and 504, respectively, of FIG. 5. The rigid backings 612 and 614 are optionally bound to the stiff support sub-layers 606 and 608, respectively.

The computing device 100 incorporating the display stack-up 600 typically has a hinge system that allows the computing device 100 to be folded. The rigid backings 612 and 614 back part of the display stack-up 600, but there are discontinuities in the hinge system that prevent the rigid backings 612 and 614 from backing the entire display stack-up 600. These discontinuities are illustrated as a gap 616 between rigid backing 612 and rigid backing 614. Although a single gap 616 of discontinuities in the rigid backings 612 and 614 is illustrated in FIG. 6, it should be noted that in some situations there can be additional areas of discontinuities in the rigid backings 612 and 614, such as areas between mating housing surfaces or other features (e.g., holes or cutouts) in the device housing that are needed for assembly of the computing device).

The stiff support sub-layer 604 spans the discontinuities in the hinge system (and optionally additional areas of discontinuities in the rigid backings 612 and 614) that prevent the rigid backings 612 and 614 from backing the entire display stack-up 600. Accordingly, the stiff support sub-layer 604 provides support to the additional layers of the display stack-up 600 (e.g., layers 306-312) despite the discontinuities in the hinge system (and optionally additional areas of discontinuities in the rigid backings 612 and 614) that prevent the rigid backings 612 and 614 from backing the entire display stack-up 600. The stiffness of the stiff support sub-layer 604 prevents the display layer 308 as well as other layers of the display stack-up 600 from being damaged despite the presence of the hinge system and any discontinuities in the hinge system that prevent the rigid backings 612 and 614 from backing the entire display stack-up 600.

The stiff support sub-layers 606 and 608 provide further support to the additional layers of the display stack-up 600 (e.g., layers 306-312), although there is a gap 618 between stiff support sub-layer 606 and stiff support sub-layer 608. In one or more embodiments, one of the stiff support sub-layers 606 and 608 is located in the base section 204 of the device housing and the other of the stiff support sub-layers 606 and 608 is located in the flip section 206 of the device housing. The gap 618 corresponds to part of the discontinuities illustrated as a gap 616 between rigid backing 612 and rigid backing 614 (e.g., this gap can contain no material, just empty space). However, it should be noted that the gap 618 is narrower (shorter along the x-axis) than the gap 616. In one or more embodiments, the gap 618 is approximately 75% of the length of the gap 616 (e.g., the gap 616 may be approximately 21 mm and the gap 618 may be approximately 16 mm).

Each stiff support sub-layer 606 and 608 is a stiff support, providing support to the higher layers in the foldable display (layers 306-308). Each stiff support sub-layer 606 and 608 can be made of various materials, such as metal (e.g., aluminum or stainless steel), glass, ceramic, graphene, or other composite. In one or more embodiments, each stiff support sub-layer 606 and 608 has a stiffness of at least 60 GPa, a thickness in the range of 20 to 60 um, and a tensile strength in the range of 1500 to 3000 MPa. With these characteristics, each stiff support sub-layer 606 and 608 has a modulus of elasticity in the range of 60 to 1200 GPa.

It should be noted that each of the stiff support sub-layers 606 and 608 have first and second base surfaces, analogous to the first and second base surfaces of the layers 304-312 discussed above. Each of these stiff support sub-layers 606 and 608 can have first and second base surfaces with geometric shapes that differ from the geometric shapes of the first and second base surfaces of the layers 604 and 306-312. Furthermore, each of these stiff support sub-layers 606 and 608 has first and second base surfaces with at least one dimension that is less than the corresponding dimension of the layers 604 and 306-312. For example, the first and second base surfaces of each of the layers 604 and 306-312 can be rectangles that are 6 centimeters (cm) wide and 15 cm long. The first and second base surfaces of each of the stiff support sub-layers 606 and 608 can be rectangles that are 6 cm wide and 12 cm long.

Although a single gap 616 of discontinuities in the rigid backings 612 and 614 is illustrated in FIG. 6, it should be noted that in some situations there can be additional areas of discontinuity in the rigid backings 612 and 614. In such situations, the stiff support sub-layer 604 provides protection to the layers of the display stack-up 600 in the presence of such additional discontinuities in the rigid backings 612 and 614. The stiff support sub-layer 606 and/or sub-layer 608 optionally also provide protection to the layers of the display stack-up 600 in the presence of such additional discontinuities in the rigid backings 612 and 614.

It should be noted that although three stiff support sub-layers 604, 606, and 608 are illustrated in FIG. 6, various additional stiff support sub-layer can optionally be included in a display stack-up for a foldable display with stiff support 102. Such additional stiff support sub-layers could be included between the stiff support sub-layer 604 and the display layer 308, between the stiff support sub-layer 604 and a stiff support sub-layer 606 or 608, between the stiff support sub-layer 606 and the rigid backing 612, between the stiff support sub-layer 608 and the rigid backing 614, combinations thereof, and so forth. Any such stiff support sub-layer would be flexible, and have a thickness and stiffness that are not greater than the thickness and stiffness ranges of the stiff support sub-layers 604, 606, and 608.

The stiff support sub-layers 606 and 608 support the curvature of the foldable display and protects against hinge/plate discontinuity when the computing device 100 is in the closed position as well as when transitioning between the closed and open positions. In one or more embodiments, the stiff support sub-layer 604 provides protection to the layers of the display stack-up 600 in the presence of discontinuities in the rigid backings 612 and 614, such as discontinuities resulting from the hinge system of the computing device, areas between mating housing surfaces or other features (e.g., holes or cutouts) in the device housing that are needed for assembly of the computing device), and so forth. The stiff support sub-layers 606 and 608 provide support and protection to the layers in the display stack-up 600 at the discontinuities where the rigid backings 612 and 614 end and the curvature of the display stack-up 600 begins (when the computing device is in a closed position or transitioning between the closed and open positions).

Figure 7:
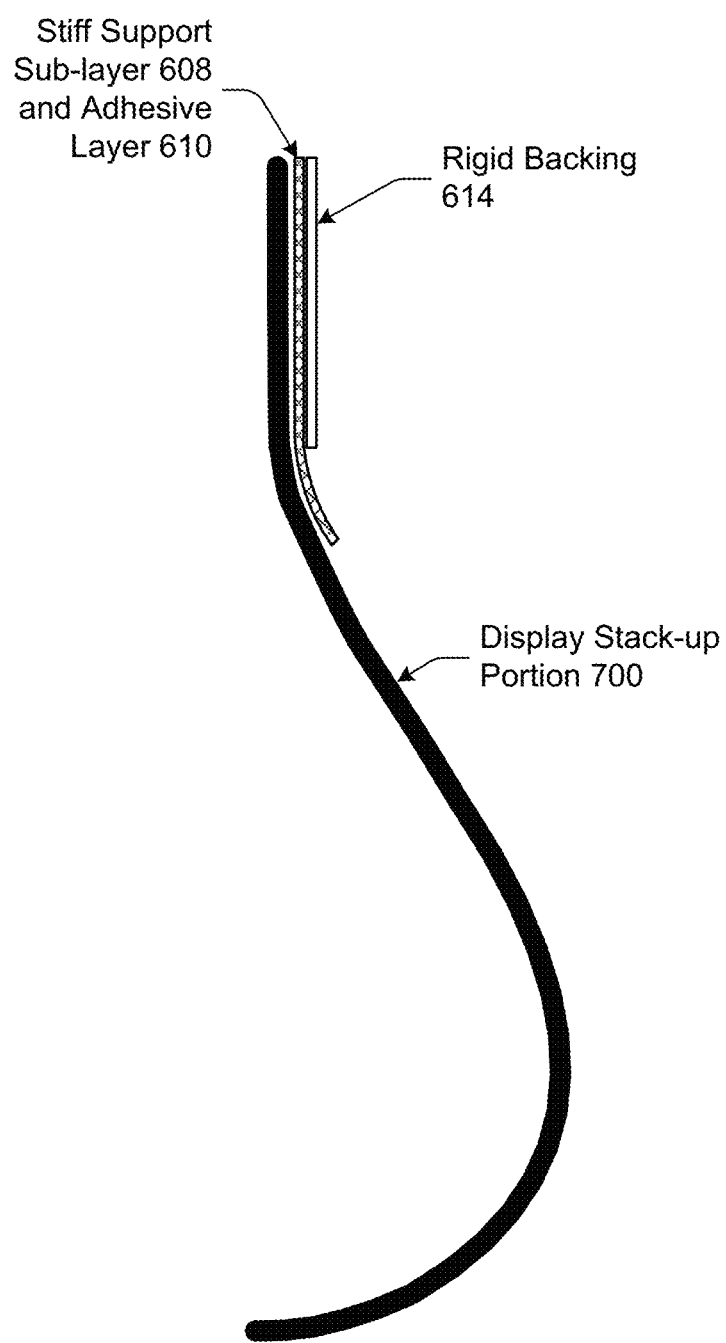
FIG. 7 illustrates an example side-view of a foldable display stack-up with multiple stiff support sub-layers.

FIG. 7 illustrates an example side-view of a foldable display stack-up with multiple stiff support sub-layers. FIG. 7 illustrates a display stack-up portion 700, the stiff support sub-layer 608 and adhesive layer 610, and the rigid backing 614. The display stack-up portion 700 is a portion of the display stack-up 600 of FIG. 6, and includes the stiff support sub-layer 604, the adhesive layer 306, the display layer 308, the optically clear adhesive layer 310, and the cover lens layer 312 (the layers of the display stack-up 600 other than the adhesive layer 610 and the stiff support sub-layers 606 and 608). It should be noted that the stiff support sub-layer 608 and adhesive layer 610 illustrated in FIG. 7 includes only the portion of the adhesive layer 610 that binds the stiff support sub-layer 608 to the stiff support sub-layer 604 (and does not include the portion of the adhesive layer 610 that binds the stiff support sub-layer 606 to the stiff support sub-layer 604).

The display stack-up portion 700 is illustrated in FIG. 7 in its folded or closed position. For example, the display stack-up portion 700 is a portion of the foldable display 208 of FIG. 2 (the foldable display 208 without the stiff support sub-layers 606 and 608 and adhesive layer 610) when the computing device 100 is in the closed position 214.

As illustrated in FIG. 7, the stiff support sub-layer 608 and adhesive layer 610 extend beyond the rigid backing 614, providing additional support for the curvature of the display stack-up 600 and protecting against discontinuities resulting from the hinge system or the rigid backing 614 while the computing device 100 is in the closed position or is transitioning between the closed and open positions. For example, the stiff support sub-layer 608 protects against the discontinuity at the end of the rigid backing 614 there is a transition from having the support of the rigid backing 614 and not having the support of the rigid backing 614 (e.g., where the display stack-up portion 700 begins to bend as illustrated).

Figure 8:
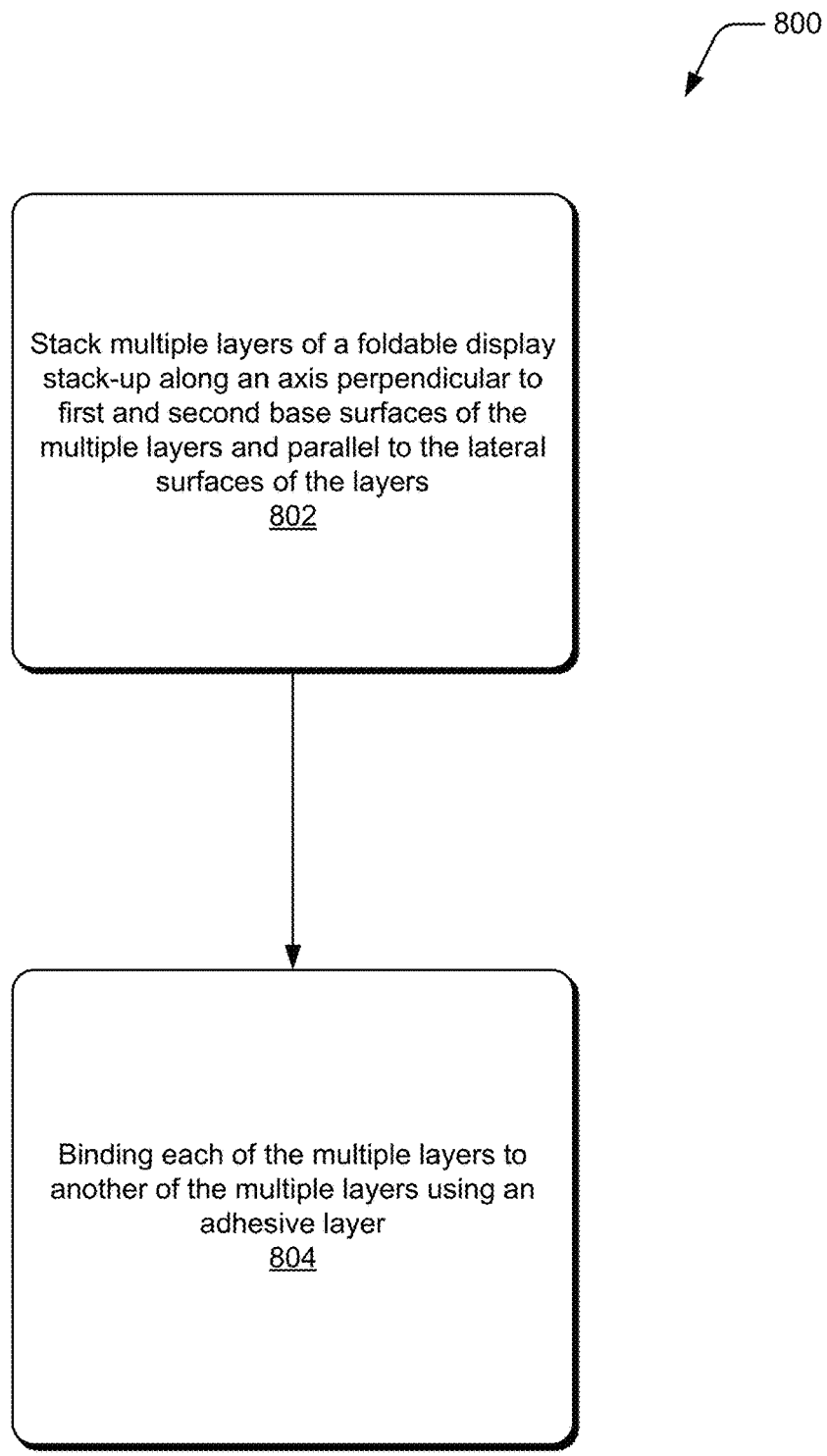
FIG. 8 illustrates an example process for implementing the techniques discussed herein in accordance with one or more embodiments.

FIG. 8 illustrates an example process 800 for implementing the techniques discussed herein in accordance with one or more embodiments. Process 800 is carried out by a computing device or system, such as a computing system for making flexible display stack-ups for electronic devices using thin-film laminate technology, and can be implemented in hardware or combinations of hardware with software or firmware. Process 800 is shown as a set of acts and is not limited to the order shown for performing the operations of the various acts.

In process 800, multiple layers of a foldable display stack-up are stacked along an axis perpendicular to first and second base surfaces of the multiple layers and parallel to the lateral surfaces of the layers (act 802). These multiple layers include the display layer and the stiff support layer discussed above, as well as optionally additional layers such as the cover lens layer. The stiff support layer has a stiffness that is at least six times greater than the stiffness of the display layer as discussed above.

Each of the multiple layers is bound to another of the multiple layers using an adhesive layer (act 804). This binding includes binding the display layer to the stiff support layer using an adhesive layer as discussed above.

Figure 9:
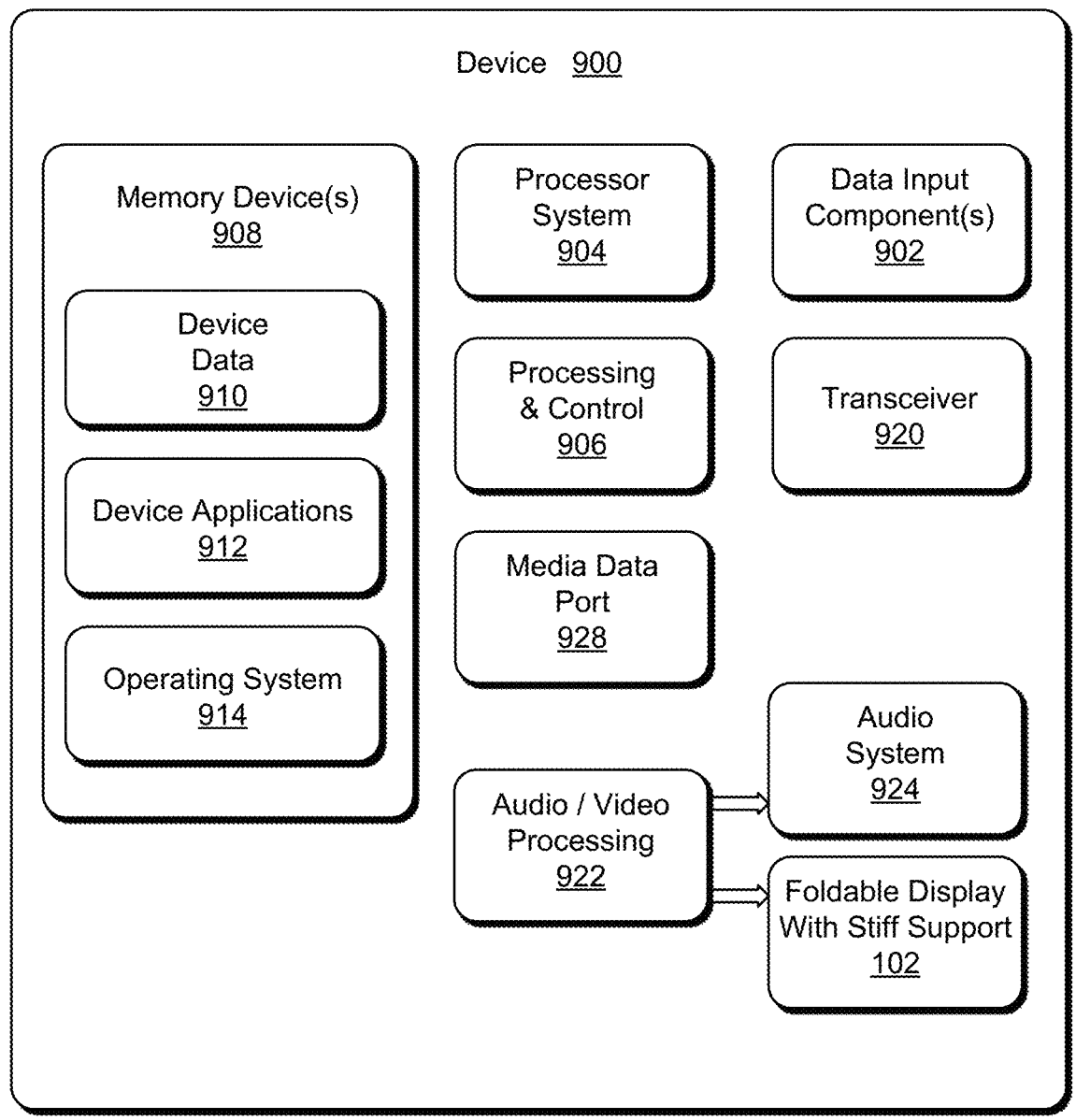
FIG. 9 illustrates various components of an example electronic device that can implement embodiments of the techniques discussed herein.

FIG. 9 illustrates various components of an example electronic device 900 that can be implemented as a computing device as described with reference to any of the previous FIGS. 1-8. The device 900 may be implemented as any one or combination of a fixed or mobile device in any form of a consumer, computer, portable, user, communication, phone, navigation, gaming, messaging, Web browsing, paging, media playback, or other type of electronic device.

The electronic device 900 can include one or more data input components 902 via which any type of data, media content, or inputs can be received such as user-selectable inputs, messages, music, television content, recorded video content, and any other type of audio, video, or image data received from any content or data source. The data input components 902 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 902 may also include various other input components such as microphones, touch sensors, keyboards, and so forth.

The electronic device 900 of this example includes a processor system 904 (e.g., any of microprocessors, controllers, and the like) or a processor and memory system (e.g., implemented in a system on a chip), which processes computer executable instructions to control operation of the device 900. A processor system 904 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 900 can be implemented with any one or combination of software, hardware, firmware, or fixed logic circuitry implemented in connection with processing and control circuits that are generally identified at 906. Although not shown, the electronic device 900 can include a system bus or data transfer system that couples the various components within the device 900. A system bus can include any one or combination of different bus structures such as a memory bus or memory controller, a peripheral bus, a universal serial bus, or a processor or local bus that utilizes any of a variety of bus architectures.

The electronic device 900 also includes one or more memory devices 908 that enable data storage such as random access memory, nonvolatile memory (e.g., read only memory, flash memory, erasable programmable read only memory, electrically erasable programmable read only memory, etc.), and a disk storage device. A memory device 908 provides data storage mechanisms to store the device data 910, other types of information or data (e.g., data backed up from other devices), and various device applications 912 (e.g., software applications). For example, an operating system 914 can be maintained as software instructions with a memory device and executed by the processor system 904.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 908.

The electronic device 900 also includes a transceiver 920 that supports wireless and/or wired communication with other devices or services allowing data and control information to be sent as well as received by the device 900. The wireless and/or wired communication can be supported using any of a variety of different public or proprietary communication networks or protocols such as cellular networks (e.g., 3G networks, 4G networks such as LTE networks, 5G networks), wireless local area networks such as Wi-Fi networks, and so forth.

The electronic device 900 also includes an audio or video processing system 922 that processes audio data or passes through the audio and video data to an audio system 924 or to a foldable display with stiff support 102. The foldable display with stiff support 102 also displays images generated by other components of the electronic device 900, such as images generated by the device applications 912, by the operating system 914, and so forth.

The audio system or the display system may include any devices that process, display, play, or otherwise render audio, video, display, or image data. Display data and audio signals can be communicated to an audio component (e.g., a speaker) or to a display component via a radio frequency link, S-video link, high definition multimedia interface (HDMI), composite video link, component video link, digital video interface, analog audio connection, or other similar communication link, such as media data port 928. In implementations the audio system or the display system are external components to the electronic device. Alternatively or in addition, the display system can be an integrated component of the example electronic device, such as part of an integrated touch interface.

Although embodiments of techniques for a foldable display with stiff support have been described in language specific to features or methods, the subject of the appended claims is not necessarily limited to the specific features or methods described. Rather, the specific features and methods are disclosed as example implementations of techniques for implementing a foldable display with stiff support.

What is claimed is:

1. A display stack-up comprising:
   a display layer that forms images for viewing, the display layer being flexible and able to bend;
   a stiff support layer providing support to the display layer, the stiff support layer being flexible and able to bend, the display layer and the stiff support layer each having a first and second base surfaces and a thickness between the first and second base surfaces that defines a height of a lateral surface at a periphery of the layer, the display layer and the stiff support layer being stacked along an axis perpendicular to their first and second base surfaces and parallel to their lateral surfaces, the stiff support layer including:
      a first stiff support sub-layer having first and second base surfaces that are approximately the same geometric shape and dimensions as the first and second base surfaces of the display layer;
      a second stiff support sub-layer and a third stiff support sub-layer each having first and second base surfaces with at least one dimension that is less than the corresponding dimension of the first and second base surfaces of the display layer, resulting in a gap between the second stiff support sub-layer and the third stiff support sub-layer at a location along an axis parallel to the first and second base surfaces where the first stiff support sub-layer lacks a gap;
   a first rigid backing and a second rigid backing each having first and second base surfaces with at least one dimension that is less than the corresponding dimension of the first and second base surfaces of the second stiff support sub-layer and the third stiff support sub-layer, resulting in a gap between the first rigid backing and the second rigid backing at a location along an axis parallel to the first and second base surfaces that overlaps the gap between the second stiff support sub-layer and the third stiff support sub-layer and that is larger than the gap between the second stiff support sub-layer and the third stiff support sub-layer; and
   an adhesive layer including an adhesive arranged to bind the display layer to the stiff support layer, the stiff support layer having a stiffness that is at least six times greater than the stiffness of the adhesive layer and at least six times greater than the stiffness of the display layer.

2. The display stack-up as recited in claim 1, wherein the stiff support layer is situated between the display layer and a housing of a computing device that includes the display stack-up.

3. The display stack-up as recited in claim 1, the stiff support layer having a stiffness of at least 60 gigapascals.

4. The display stack-up as recited in claim 3, the stiff support layer having a thickness in a range of 20 to 60 micrometers.

5. The display stack-up as recited in claim 1, the display stack-up further comprising:
   a cover lens layer providing protection to the display layer; and
   an optically clear adhesive layer including an optically clear adhesive arranged to bind the display layer to the cover lens layer, the optically clear adhesive layer binding the cover lens layer to an opposite surface of the display layer than the adhesive layer binds the stiff support layer to.

6. The display stack-up as recited in claim 1, the first stiff support sub-layer, the second stiff support sub-layer, and the third stiff support sub-layer each having a stiffness of at least 60 gigapascals.

7. The display stack-up as recited in claim 1, the first stiff support sub-layer, the second stiff support sub-layer, and the third stiff support sub-layer each having a thickness in a range of 20 to 60 micrometers.

8. The display stack-up as recited in claim 1, the second stiff support sub-layer being located in a base section of a housing of a computing device that includes the display stack-up, and the third stiff support sub-layer being located in a flip section of the housing.

9. The display stack-up as recited in claim 8, the display stack-up forming a teardrop shape when the housing is in a closed position.

10. The display stack-up as recited in claim 1, further comprising a first additional adhesive layer including an adhesive arranged to bind the first stiff support sub-layer to the second stiff support sub-layer, and a second additional adhesive layer including an adhesive arranged to bind the first stiff support sub-layer to the third stiff support sub-layer.

11. A method of generating a foldable display, the method comprising:
stacking multiple layers including a display layer, a stiff support layer, a first rigid backing, and a second rigid backing, the display layer forming images for viewing and being flexible and able to bend, the stiff support layer providing support to the display layer and being flexible and able to bend, the display layer and the stiff support layer each having a first and second base surfaces and a thickness between the first and second base surfaces that defines a height of a lateral surface at a periphery of the layer, the stacking including stacking the display layer and the stiff support layer along an axis perpendicular to their first and second base surfaces and parallel to their lateral surfaces, the stiff support layer including a first stiff support sub-layer, a second stiff support sub-layer, and a third stiff support sub-layer, the first stiff support sub-layer having first and second base surfaces that are approximately the same geometric shape and dimensions as the first and second base surfaces of the display layer, the second stiff support sub-layer and the third stiff support sub-layer each having first and second base surfaces with at least one dimension that is less than the corresponding dimension of the first and second base surfaces of the display layer, resulting in a gap between the second stiff support sub-layer and the third stiff support sub-layer at a location along an axis parallel to the first and second base surfaces where the first stiff support sub-layer lacks a gap, the first rigid backing and the second rigid backing each having first and second base surfaces with at least one dimension that is less than the corresponding dimension of the first and second base surfaces of the second stiff support sub-layer and the third stiff support sub-layer, resulting in a gap between the first rigid backing and the second rigid backing at a location along an axis parallel to the first and second base surfaces that overlaps the gap between the second stiff support sub-layer and the third stiff support sub-layer and that is larger than the gap between the second stiff support sub-layer and the third stiff support sub-layer; and
binding the display layer to the stiff support layer using an adhesive layer, the stiff support layer having a stiffness that is at least six times greater than the stiffness of the adhesive layer and at least six times greater than the stiffness of the display layer.

12. The method as recited in claim 11, the multiple layers further including a cover lens layer providing protection to the display layer, the method further comprising:
binding the cover lens layer to the display layer using an optically clear adhesive, the binding including binding the cover lens layer to an opposite surface of the display layer than the stiff support layer is bound to.

13. The method as recited in claim 11, the binding the display layer to the stiff support layer comprising binding the display layer to the first stiff support sub-layer, and binding the second stiff support sub-layer and the third stiff support sub-layer to the first stiff support sub-layer.

14. The method as recited in claim 11, the display layer forming a teardrop shape when in a housing of a computing device that is in a closed position.

15. A computing device comprising:
a housing including a base section, a flip section, and a hinge system between the base section and the flip section; and
a display stack-up including:
a display layer that forms images for viewing, the display layer being flexible and able to bend;
a stiff support layer providing support to the display layer, the stiff support layer being flexible and able to bend, the display layer and the stiff support layer each having a first and second base surfaces and a thickness between the first and second base surfaces that defines a height of a lateral surface at a periphery of the layer, the display layer and the stiff support layer being stacked along an axis perpendicular to their first and second base surfaces and parallel to their lateral surfaces, the stiff support layer being situated between the display layer and the housing, the stiff support layer including:
a first stiff support sub-layer having first and second base surfaces that are approximately the same geometric shape and dimensions as the first and second base surfaces of the display layer;
a second stiff support sub-layer and a third stiff support sub-layer each having first and second base surfaces with at least one dimension that is less than the corresponding dimension of the first and second base surfaces of the display layer, resulting in a gap between the second stiff support sub-layer and the third stiff support sub-layer at a location along an axis parallel to the first and second base surfaces where the first stiff support sub-layer lacks a gap;
a first rigid backing and a second rigid backing each having first and second base surfaces with at least one dimension that is less than the corresponding dimension of the first and second base surfaces of the second stiff support sub-layer and the third stiff support sub-layer, resulting in a gap between the first rigid backing and the second rigid backing at a location along an axis parallel to the first and second base surfaces that overlaps the gap between the second stiff support sub-layer and the third stiff support sub-layer and that is larger than the gap between the second stiff support sub-layer and the third stiff support sub-layer; and an adhesive layer including an adhesive arranged to bind the display layer to the stiff support layer, the stiff support layer having a stiffness that is at least six times greater than the stiffness of the adhesive layer and at least six times greater than the stiffness of the display layer.

16. The computing device as recited in claim 15, the stiff support layer having a stiffness of at least 60 gigapascals.

17. The computing device as recited in claim 16, the stiff support layer having a thickness in a range of 20 to 60 micrometers.

18. The computing device as recited in claim 15, the first stiff support sub-layer, the second stiff support sub-layer, and the third stiff support sub-layer each having a stiffness of at least 60 gigapascals, the second stiff support sub-layer being located in the base section of the housing, and the third stiff support sub-layer being located in the flip section of the housing.

19. The computing device as recited in claim 15, the display stack-up forming a teardrop shape when the housing is in a closed position.

20. The computing device as recited in claim 19, the first stiff support sub-layer and the second stiff support sub-layer providing support to the display layer at discontinuities where the first rigid backing and the second rigid backing end and a curvature of the display stack-up begins.

* * * * *